United States Patent Office 2,836,536
Patented May 27, 1958

2,836,536

FUNGICIDAL COMPOSITIONS CONTAINING 1,4-DIBROMO-2-BUTYNE AND METHODS OF DESTROYING FUNGI

Lloyd J. Meuli, Long Beach, Calif., assignor to The Dow Chemical Company, Midland, Mich., a corporation of Delaware No Drawing. Application August 2, 1954
Serial No. 447,376

10 Claims. (Cl. 167—22)

The present invention relates to the culture and protection of crops and is particularly concerned with a new agronomical practice and composition for improving the emergence, seedling growth and harvest of crop plants.

It is an object of the present invention to provide a new and improved agronomical practice for the culture of crops. Another object is the provision of a practice for protecting the roots of plants from the attack of soil-dwelling fungi. A further object is the provision of a novel composition adapted to be employed in the new practice for growing and protecting crops. Other objects will become apparent from the following specification and claims.

The new agronomical practice comprises treating soil or growth media with 1,4-dibromo-2-butyne to benefit plants grown in the treated soil. Such practice protects the plants from the ravages of soil-dwelling fungi which attack their roots and improves the emergence and growth of seedlings as well as the crop harvest.

1,4-dibromo-2-butyne is a mobile liquid boiling at 80° C. at 2.7 millimeters pressure, somewhat soluble in many organic solvents and of low solubility in water and is adapted readily and conveniently to be distributed in soil or growth media. Further when so distributed, the compound accomplishes a rapid control of root-attacking fungi. It is among the advantages of the present invention that the compound permeates growth media for a short distance from the point of application depending upon the temperature, moisture content, compactness, and physical consistency of the media. It is a further advantage that the compound is sufficiently persistent to accomplish the desired effect upon the soil-dwelling fungi but dissipates in a reasonable period of time.

The distribution of an effective dosage of 1,4-dibromo-2-butyne in soil or growth media is essential for the practice of the present invention. In general, good results are obtained when the compound is distributed through the growth media in the amount of from about 2 to 150 parts or more by weight per million parts by weight of the medium. In field applications the butyne compound may be distributed in the soil at a dosage of from 0.1 to 150 or more pounds per acre and through such a cross-section of the soil as to provide for the presence therein of an effective concentration of the treating agent. In general field applications it is usually preferred that the compound be distributed to a depth of at least 2 inches. In applications to the furrow seed row for the suppression of seedling diseases, it is desirable that the compound be distributed upon the surfaces of the furrow at a dosage of at least 0.15 pound per acre of furrow soil surface. Oftentimes it is desirable to distribute the compound to a depth of 24 or more inches to avoid reinfestation of the soil from deep-dwelling fungi.

In one embodiment of the invention, the treated soil is planted with the desired crop plant following the distribution of the butyne compound in the soil. Where minimum dosages of the butyne compound are distributed in soil, the treated soil may be immediately planted with the desired crop. Following the distribution of larger dosages of the butyne compound it is desirable that any planting operation not be carried out for a period of from several hours to several days, the exact period depending upon the concentration of the butyne compound in the soil and the resistance of the species concerned to the compound. Where the compound is employed for the treatment of the soil adjacent to the root system of established plants having a resistance to to the butyne compound and in side-dressing operations, the existing vegetation is not unfavorably affected by minimum effective concentrations of the butyne compound temporarily present in the soil.

The method of the present invention may be carried out by distributing the unmodified 1,4-dibromo-2-butyne compound through the growth media as by impregnation. However, the present method also embraces the employment of a liquid or dust composition containing the toxicant. In such usage, the butyne compound may be modified with one or a plurality of additaments or soil treating or parasiticide adjuvants, including water or other liquid carriers, surface active dispersing agents and finely divided inert solids. Depending upon the concentration of toxicant such augmented compositions are adapted to be distributed in the soil, or employed as concentrates and subsequently diluted with additional inert carrier to produce the ultimate treating compositions. The required amount of the butyne compound in the growth media conveniently may be supplied per acre treated in from 5 to 27,000 gallons or more of the liquid carrier or in from about 20 to 2,000 pounds of the solid carrier.

The exact concentration of the butyne compound to be employed in compositions for the treatment of growth media may vary provided the required dosage of effective agent is supplied. The concentration of toxicant in liquid compositions employed to supply the desired dosage generally is from about 0.001 to 50 percent by weight, although compositions containing as high as 90 percent may be employed. In dusts, the concentration of toxicant may be from about 1 to 20 percent by weight. In compositions to be employed as concentrates, the toxicant may be present in a concentration of from about 5 to 95 percent by weight.

Liquid compositions containing the desired amount of the butyne compound may be prepared by dissolving the toxicant in an organic liquid such as acetone, toluene, methylene, chloride, chlorobenzene and petroleum distillates or by dispersing the toxicant in water with the aid of a suitable surface-active dispersing agent such as an ionic or non-ionic emulsifying agent. The preferred organic solvent carriers are those which are adapted to accomplish the penetration and impregnation of the soil with the butyne compound and are of such volatility they evaporate from the soil and leave little permanent residue therein. Particularly desirable carriers in this group are the petroleum distillates boiling almost entirely under 400° F. at atmospheric pressure and having a flash point above about 80° F.

The aqueous compositions may contain one or more water-immiscible solvents for the butyne compound. In such compositions, the carrier comprises an aqueous emulsion, i. e. a mixture of water-immiscible solvent, emulsifying agent and water. The choice of dispersing an emulsifying agent and the amount thereof employed is dictated by the nature of the composition type and by the ability of the agent to facilitate the dispersion of the butyne compound in the aqueous carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

In the preparation of dust compositions, the 1,4-dibromo-2-butyne is dispersed in and on a finely divided inert solid such as talc, chalk, gypsum and the like. In such operations, the carrier is mechanically ground with the compound or wet with a volatile organic solvent solution thereof. Similarly, dust compositions containing the compound may be prepared from various of the solid surface active dispersing agents, such as bentonite, fuller's earth, attapulgite and other clays. Depending upon the proportions of ingredients, these dust compositions may be employed as concentrates and subsequently diluted with additional solid surface active dispersing agent or with talc, chalk or gypsum and the like to obtain the desired amount of active ingredient in a composition adapted to be employed for the treatment of soil. Also, such concentrate dust compositions may be dispersed in water with or without the aid of a dispersing agent to form aqueous soil treating compositions.

A further preferred embodiment of the present invention is a novel composition comprising soil in admixture with an effective concentration of 1,4-dibromo-2-butyne.

When operating in accordance with the present invention, the soil may be impregnated with the butyne compound or a composition containing the toxicant, in any convenient fashion, e. g. by simple mixing with the soil, by applying to the surface of soil and thereafter dragging or discing into the soil to the desired depth or by employing a liquid carrier to accomplish the penetration and impregnation. In another method, the compound is distributed upon the surfaces of the seed furrow and the furrow thereafter planted and compacted about the seed. In general, it is desirable that the distribution be carried out at a soil temperature of 45° F. or higher since the effectiveness of the butyne compound may be somewhat reduced at lower temperatures.

In a preferred embodiment, the method of the present invention is carried out in soil having a moisture content of from about 50 to 100 percent of the moisture equivalent of the soil. When operating under such soil conditions, maximum improvements in crop yields and controls of nematodes are obtained. L. M. Thompson in "Soils and Soil Fertility," McGraw Book Co., Inc. (1952), defines the moisture equivalent of a soil as equal to the percentage of water retained by wet soil after being centrifuged at 1000 times gravity. This equivalent is about the same as the so-called field capacity which may be defined as the moisture condition of the soil when downward movement of water into the soil has virtually ceased. This moisture equivalent or field capacity is dependent primarily upon the percentage of organic matter in the soil, the size of the soil particles and the porosity of the soil.

In a further method, the distribution may be accomplished by introducing the toxicant in the water employed to irrigate the soil. In such procedure, the amount of water may be varied in accordance with the moisture content and the moisture equivalent or field capacity of the soil in order to obtain the desired depth of distribution of the toxicant at a soil moisture content equal to the moisture equivalent. In such method, the butyne compound readily and conveniently may be distributed to a depth of from two to four feet or more to avoid reinfestation from deep-dwelling organism.

The expressions "growth media" or "soil" are employed in the present specification and claims in their broadest sense to be inclusive of all conventional "soils," as defined in Webster's New International Dictionary, second edition, unabridged, published in 1937 by G. and C. Merriam Company, Springfield, Massachusetts. Thus, the terms refer to any substances or media in which vegetation may take root and grow, and are intended to include not only earth but compost, manure, muck, humus, and sand and the like, adapted to support plant growth.

The following examples illustrate the invention but are not to be construed as limiting the same.

Example 1

Acetone solutions containing 15 and 3 grams of 1,4-dibromo-2-butyne were employed for the treatment of a sandy loam soil heavily infested with the organisms *Fusarium solani*, *Pythium spp.* and *Rhizoctonia solani*. At the time of treatment the soil had a moisture content of 7 percent, the latter being about 50 percent of the field capacity of the soil. In the treating operations, the soil was placed in sealable containers and separately injected with the acetone compositions in amounts sufficient to supply, respectively, 25 and 5 parts by weight of the 1,4-dibromo-2-butyne compound per million parts by weight of soil. Following the treatment the containers were sealed and the soil therein mechanically mixed to insure uniform distribution of the toxicant compositions. After mixing, the containers of treated soil were incubated at the average temperature of 25° C. In a check operation, sealed containers containing the same infested but untreated soil were exposed to identical conditions as the treated soil.

After three days, the containers were opened and portions of the treated and untreated soil cultured by the dilution plate method as described by J. P. Martin in "Soil Science," 69, No. 3, pp. 215–32 (March 1950), to determine the percent control of fungal organisms. In the latter operations, the culturing medium employed was a peptone dextrose agar (1000 milliliters of water, 10 grams of dextrose, 5 grams of peptone, 1 gram of $KH_2PO_4$, 0.5 gram of $MgSO_4 \cdot 7H_2O$ and 20 grams of agar) containing 0.069 gram of rose bengal and 0.030 gram of streptomycin per liter of ultimate mixture. In the plating operations, the culturing medium was incorporated with about 0.5 gram of soil sample per liter of medium and the plates thereafter poured in replicates of three for the treated and check soils. The poured plates were then incubated for three days at 25° C.

After incubation the plates were examined and counts of fungal colonies made in order to determine the percent control of the fungal organisms. From the examination there was found a 100 percent control of fungal organisms in the soil treated with the 1,4-dibromo-2-butyne compound.

Example 2

In a further operation, an acetone solution containing 15 grams of 1,4-dibromo-2-butyne was employed for the treatment of the fungal infested soil of Example 1. In the treating operations, the soil was placed in sealable jars and thereafter injected with the acetone solution in an amount sufficient to supply 25 parts by weight of 1,4-dibromo-2-butyne per million parts by weight of soil. Immediately after treatment, the soil in the jars was seeded to cotton, the jars thereafter sealed and the seeded soil therein mechanically mixed to insure uniform distribution of the toxicant composition. In a check operation, the same infested but untreated soil was placed in jars, the soil seeded with cotton seeds and the jars thereafter sealed. Three days after seeding, the jars were opened, sufficient water added to each jar to encourage seedling growth and the jars immediately sealed.

Ten days after seeding, the jars were opened, the seedlings removed and the roots examined in order to determine the number of disease free plants. As a result of the examination, it was found that 90 percent of the seedlings from the soil which had been treated with the butyne compound were free of fungal disease. In the check soils all of the cotton seedlings were found to be heavily infested with the complex of root-rot fungi.

Example 3

Fifty parts by weight of 1,4-dibromo-2-butyne, 45 parts of xylene and 5 parts of a dimeric alkylated aryl polyether alcohol (Triton X–155) are mixed together to prepare a concentrate composition in the form of an emulsifiable liquid.

Also, 90 parts by weight of 1,4-dibromo-2-butyne and 10 parts of a sorbitan monolaurate polyoxyethylene derivative (Tween 20) are mechanically mixed together to prepare a water-dispersible concentrate composition.

These compositions are adapted to be dispersed in water to produce aqueous compositions having very desirable wetting and penetrating properties. The latter compositions are adapted to be employed to treat soil and to distribute 1,4-dibromo-2-butyne therein in effective concentrations.

Example 4

The water-dispersible concentrate composition of Example 3 is dispersed in water to prepare a composition containing about 100 pounds of 1,4-dibromo-2-butyne per 200 gallons of ultimate mixture. The latter composition, while under agitation is metered into irrigation water at the pump outlet at the rate of 2 gallons per 1000 gallons of irrigation water. The water is in a state of turbulent flow as it comes from the pump which provides for the thorough mixing of the toxicant therein. About 3 acre-inches of irrigation water is applied to land heavily infested with *Fusarium solani, Pythium spp.* and *Rhizoctonia solani* to accomplish a wetting of the soil to a depth of about 18 inches. Two weeks after the treatment, the soil is planted with lima beans. In a check operation, adjacent but similarly infested soil is also planted to lima beans. Seven weeks after seeding, the plots are inspected and representative plants lifted from the soil and their roots examined for evidence of root-rot disease. The examination indicates a commercial control of the complex of root-rot fungi in the treated soil with heavy infestation in the check plots.

Example 5

1,4-dibromo-2-butyne was employed for the treatment of a sandy loam soil heavily infested with the fungus organisms *Fusarium solani, Pythium spp.* and *Rhizoctonia solani*. At the time of treatment, the soil had a moisture content of 7 percent, the latter being about 50 percent of the field capacity of the soil. In the treating operations, the soil was placed in sealable vessels and separately injected with an acetone solution containing 6 grams of 1,4-dibromo-2-butyne per liter of ultimate mixture and the vessels sealed. The amounts of acetone composition employed were sufficient to supply a concentration of 10 parts by weight of 1,4-dibromo-2-butyne per million parts by weight of soil. The soil in the sealed vessels was then mechanically mixed to insure uniform distribution of the toxicant composition therein. After 30 minutes of mixing the soil was removed from the vessels, spread in containers to a depth of about 3.5 inches and seeded with lima beans. In a check operation, the same infested but untreated soil was similarly spread in containers and seeded with lima beans. The containers of seeded soil were then watered to a soil moisture content of about field capacity and thereafter placed in a cold room at 45° F. and 82 percent relative humidity to provide conditions conducive to slow germination of the seed and favorable for the rapid infestation of the seed with the complex of root-rot fungi. After 7 days in the cold room, the containers of seeded soil were removed and thereafter maintained in a greenhouse according to conventional practices with regard to light, temperature and moisture. During subsequent growing period there was observed no adverse effect upon the germination and growth of seedlings attributable to the butyne compound.

Two weeks after seeding, the containers were inspected to determine the percentage emergence of seedlings. From the examination, there was found to be a 92 percent emergence of lima bean seedlings in the treated soil. In the check soil there was a zero emergence of bean seedlings.

Example 6

1,4-dibromo-2-butyne is dispersed on and in finely divided silicon dioxide aerogel (Hi-Sil) to produce a composition containing 84 grams of toxicant per 1000 grams of ultimate composition. This composition was employed for the treatment of seed beds containing a sandy loam soil infested with *Fusarium solani, Pythium spp.* and *Rhizoctonia solani*. At the time of treatment, the soil had a moisture content equal to about 75 percent of the field capacity. Prior to treatment, the soil had been furrowed for seeding with cotton. In the treating operations, the bottoms and sides of the furrows were dusted with the composition of a dosage of 50 grams of composition per 100 feet of open furrow. Immediately following the treatments, cotton seeds were planted in the furrows and the soil compacted about the seeds according to conventional planting practices. In a check operation, seed beds of the same infested but untreated soil were similarly planted with cotton. During the subsequent growing period, there was observed no adverse effect upon the germination and growth of seedlings attributable to the butyne compound.

At intervals the seed beds were inspected to determine the percentage emergence of cotton seedlings and the percent of seedlings which survived following emergence. From the observations there was found an emergence of 77 percent of cotton seedlings in the treated soil and a survival of 50 percent of the emerged seedlings. In the check plots there was an emergence of 51 percent of cotton seedlings with a survival of 35 percent of the emerged seedlings.

I claim:

1. An agronomical practice which comprises impregnating fungus infected soil with a fungicidal amount of 1,4-dibromo-2-butyne and thereafter planting the treated soil.

2. An agronomical practice which comprises treating fungus infected soil with a fungicidal amount of 1,4-dibromo-2-butyne.

3. In the practice of plant husbandry, the method which comprises impregnating fungus infected soil with 1,4-dibromo-2-butyne in the amount of at least 2 parts by weight per million parts by weight of soil.

4. In the practice of agricultural economy, the method which comprises impregnating fungus infected field soil with a composition made up of 1,4-dibromo-2-butyne in admixture with a fungicide adjuvant as a carrier therefor, the impregnation being carried out so as to provide at least 2 parts by weight of the butyne compound per million parts by weight of soil.

5. An agronomical practice which comprises impregnating fungus infected field soil with 1,4-dibromo-2-butyne at a substantially uniform dosage of at least 0.1 pound per acre, the impregnation being carried out through such a cross-section of the soil as to provide for the presence therein of at least 2 parts by weight of the butyne compound per million parts by weight of soil.

6. The method claimed in claim 3 wherein the soil at the time of treatment with the butyne compound has a moisture content of from 50 to 100 percent of the moisture equivalent of said soil.

7. A composition comprising at least 0.001 percent by weight of 1,4-dibromo-2-butyne in intimate admixture with a solution of an emulsifying and dispersing agent as a fungus adjuvant carrier therefor.

8. A composition comprising a petroleum distillate solution of 1,4-dibromo-2-butyne, the petroleum distillate in such composition being a carefully cut portion boiling almost entirely under 400° F. and having a flash point above 80° F.

9. A concentrate composition comprising at least 5 percent by weight of 1,4-dibromo-2-butyne in intimate admixture with a surface active dispersing agent as a fungicidal adjuvant carrier therefor.

10. The method claimed in claim 4 wherein the fungicide adjuvant is a petroleum distillate boiling almost entirely under 400° F. and having a flash point above 80° F.

References Cited in the file of this patent

UNITED STATES PATENTS

| | | |
|---|---|---|
| 2,057,044 | Meisenburg et al. | Oct. 13, 1936 |
| 2,502,244 | Carter | Mar. 28, 1950 |
| 2,661,379 | Calingaert | Dec. 1, 1953 |
| 2,704,246 | Goodhue et al. | Mar. 15, 1955 |

FOREIGN PATENTS

| | | |
|---|---|---|
| 595,539 | Great Britain | Dec. 8, 1947 |

OTHER REFERENCES

Frear D. E. H.: Chemistry of Insecticides, Fungicides and Herbicides, 2nd ed., September 1948, pp. 108–122.